2,862,365

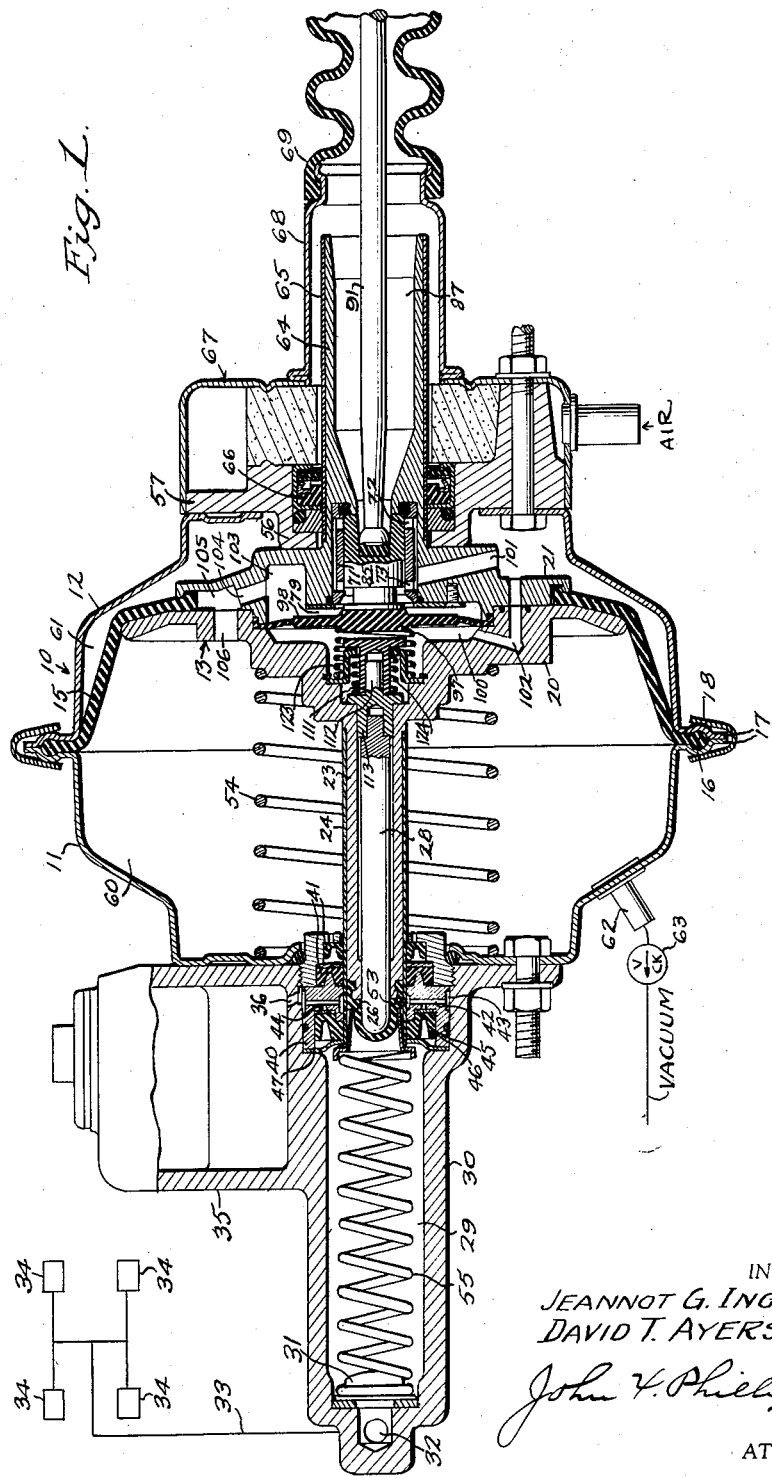
INVENTORS
JEANNOT G. INGRES
DAVID T. AYERS JR.
ATTORNEY

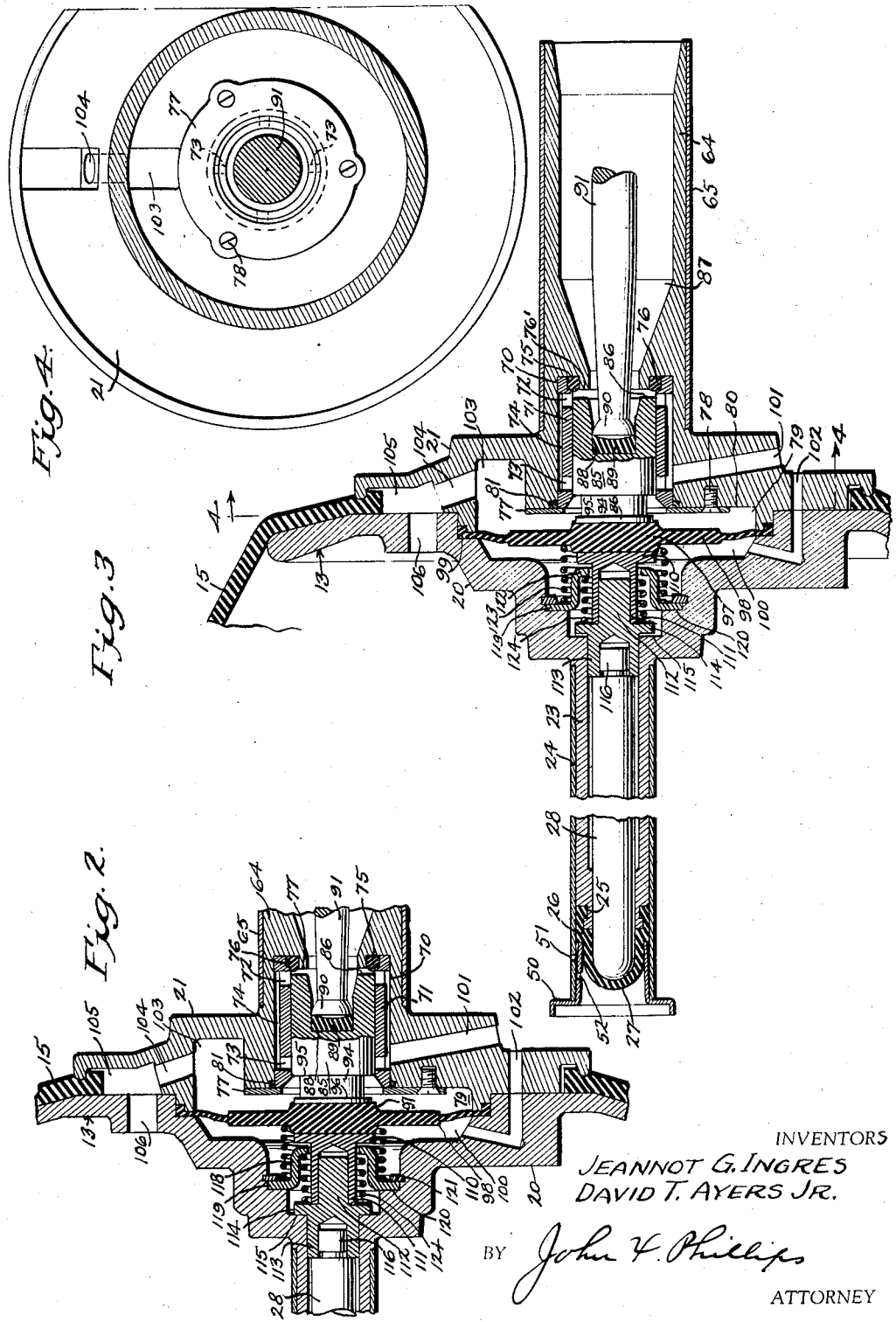
Dec. 2, 1958 — J. G. INGRES ET AL — 2,862,365
BOOSTER BRAKE MECHANISM
Filed Nov. 26, 1952 — 2 Sheets-Sheet 2
INVENTORS
JEANNOT G. INGRES
DAVID T. AYERS JR.
BY John F. Phillips
ATTORNEY

United States Patent Office 2,862,365
Patented Dec. 2, 1958

BOOSTER BRAKE MECHANISM

Jeannot G. Ingres, Dearborn, and David T. Ayers, Jr., Birmingham, Mich., assignors to Kelsey-Hayes Company, a corporation of Delaware Application November 26, 1952, Serial No. 322,662

8 Claims. (Cl. 60—54.6)

This invention relates to a booster brake mechanism. In our co-pending application Serial No. 318,497, filed November 3, 1952, issued as U. S. Letters Patent 2,763,-989 on September 25, 1956, there is disclosed a highly perfected type of booster brake mechanism particularly adapted for direct actuation by the brake pedal of a vehicle without the use of a conventional master cylinder, the high pressure hydraulic chamber of the mechanism serving as the master cylinder. In such co-pending application there is disclosed a novel type of booster motor control valve mechanism and associated parts of such construction that initial movement of the brake pedal does not transmit any force tending to build up pressure in the high pressure chamber, thus eliminating a false initial "feel" in the brake pedal.

In most devices of this type, whether directly pedal-actuated or actuated by hydraulic fluid from the master cylinder, initial movement of the brake pedal displaces fluid from the high pressure chamber of the booster. In the direct pedal-actuated types, a plunger, adapted for manual actuation, projects through a sleeve type plunger connected to the pressure-movable unit of the booster motor and cooperates therewith to displace fluid from a high pressure chamber into the lines leading to the brake cylinder. It is particularly desirable in such type of booster to eliminate substantial resistance to the brake pedal during initial movement thereof, and the structure of the co-pending application accomplishes this purpose. Such structure, therefore, is highly desirable in many installations, but in some cases initial pedal movement is too "soft" and is objectionable for this reason.

An important object of the present invention is to provide a booster brake mechanism including a fluid pressure operated booster motor, wherein the control valve for the booster motor is initially movable without generating hydraulic pressure in the high pressure chamber, and wherein more than the normal initial resistance of a light spring is encountered by pressure of the foot on the brake pedal, thus preventing too "soft" an initial operation of the brake pedal.

A further object is to provide such a mechanism wherein initial movement of the brake pedal starts to energize the booster motor and wherein differential pressures generated in the booster motor are reproduced on opposite sides of a pressure-responsive element which is utilized to resist initial movement of the brake pedal, the resistance of such pressure-responsive element varying in accordance with the degree of energization of the booster motor, which is desirable.

A further object is to provide such an apparatus wherein, during later stages of the booster operation, the pressure-responsive element coacts with pressure generated in the high pressure hydraulic chamber to resist movement of the brake pedal so that proportionately heavy resistances are encountered as brake application progresses.

A further object is to provide an apparatus of the character referred to having features of such character as to render practicable the use of sleeve valves or other axially slidable elements, leakage through such a valve mechanism of pressure from the high pressure source being prevented when the parts are in the "off" position.

A further object is to provide such a device wherein a spool valve is movable to energize the booster motor and to encounter the resistance of the pressure-responsive element referred to, and to provide means engageable with the spool valve when the latter is in its "off" position for preventing leakage between the spool valve and its surrounding sleeve of fluid from the high pressure source, in this case preferably atmospheric pressure.

Other objects and advantages of the invention will become apparent during the course of the description.

In the drawings we have shown one embodiment of the invention. In this drawing:

Figure 1 is a longitudinal sectional view, through a complete booster mechanism embodying the present invention, parts being broken away and parts being shown in section, and the brake cylinders and connecting lines being shown diagrammatically;

Figure 2 is an enlarged fragmentary axial sectional view of the central portion of the pressure-responsive unit of the booster motor and associated elements, illustrating the valve mechanism under an intermediate brake operating condition;

Figure 3 is a similar view showing additional parts and illustrating the positions of the valve element and associated parts under further brake-applied conditions; and Figure 4 is a sectional view taken substantially on line 4—4 of Figure 3, the motor diaphragm being omitted.

Referring to Figure 1 the numeral 10 designates as a whole the booster motor for the apparatus shown in the present instance as being of the vacuum suspended type as will become apparent. The motor comprises a pair of casing sections 11 and 12 having arranged therebetween a pressure-responsive unit indicated as a whole by the numeral 13 and including as a part thereof a relatively heavy flexible diaphragm 15 having a peripheral bead 16 clamped between flanges 17 formed on the motor casing sections and held in position by a suitable clamping ring 18.

The pressure-responsive unit 13 further comprises a preferably die cast body 20 and a preferably similarly formed cap member 21, both of which are further described in detail below. The body 20 carries a preferably integral axial sleeve 23 surrounded by a relatively thin sleeve 24, preferably formed of stainless steel, to provide a smooth outer surface and to provide a sleeve projecting beyond the sleeve 23 as somewhat more clearly shown in Figure 3, for a purpose to be described.

Referring to Figure 3 it will be noted that the main sleeve 23 is grooved as at 25 for connection with a resilient sealing cap 26 having a hemispherical end 27 fitting over the rounded end of a manually operable plunger 28, described in detail below. It will become apparent that the plunger 28 and sleeve 23 move to the left during braking operation to displace fluid from a high pressure chamber 29 formed in a suitable body 30 (Figure 1). The resilient sealing cap 26 prevents the leakage of pressure fluid between the plunger 28 and sleeve 23.

Referring to Figure 1, it will be noted that the chamber 29 is provided in the outlet end thereof with a conventional residual pressure valve 31 controlling the flow of fluid through an outlet port 32 connected to a line 33 branched to supply braking fluid to conventional brake cylinders 34. The body 30 is provided at the top thereof with a hydraulic fluid reservoir 35 having an outlet port 36 for supplying fluid to the chamber 29 under conditions to be described.

The outer sleeve 24 of the pressure-responsive unit of the motor is sidable in a bearing 40 carried by the body 30 and suitable seals 41 surround the sleeve 24 to assist in sealing the latter against leakage of hydraulic fluid into the booster motor. The bearing 40 is provided with radial ports 42 communicating through an annular groove 43 with the port 36 and further communicating through branch ports 44 with the bottom of a groove 45 in the bearing 40 receiving a double lipped seal 46. An apertured ring 47 retains the seal 46 in position.

Referring to Figure 3 it will be noted that the seal 26 forms a shoulder engageable by the inner end of a spring seat 50. The sleeve 24 and spring seat 50 are apertured as at 51 and 52 respectively for the flow of hydraulic fluid from the passages 42 into chamber 29 when the parts are in the "off" positions shown in Figure 1. It will be noted that the inner ends of the passages 42 communicate with an annular groove 53 for the flow of fluid from the passages 42 through ports 51 and 52. The port 51 is out of communication with the groove 53 during brake application, thus disconnecting the reservoir from the high pressure chamber 29. If, during sudden releasing of the brake elements, subatmospheric pressure occurs in the chamber 29, atmospheric pressure in the reservoir 35 will force fluid through ports 44, around the outer lip of seal 46 and through apertures in the retainer 47 to tend to satisfy the partial vacuum in the chamber 29. The bearing, sealing and fluid replenishing features referred to form no part of the present invention, but are disclosed and claimed in the co-pending application of David T. Ayers, Jr., Serial No. 318,495, filed November 3, 1952, issued as U. S. Letters Patent 2,767,548 on October 23, 1956.

The sleeves 23 and 24 are fixed with respect to each other and are urged to the "off" positions shown by means of a spring 54, between the pressure movable unit 13 and the end of the casing section 11, and by a spring 55, which also seats against the residual pressure valve 31. These springs serve to move the parts referred to do a limit of movement in the "off" position determined by engagement of the member 21 with a shoulder 56 (Figure 1) carried by a cast body 57 acting as a closure for the motor casing section 12 and serving other purposes to be referred to.

The pressure-responsive unit 13 divides the motor into a pair of chambers, one of which is a constant vacuum chamber 60 and the other of which is a variable pressure chamber 61. By means of valve mechanism to be described the chambers 60 and 61 are in communication with each other when the apparatus is inoperative, thus vacuum suspending the pressure-responsive unit 13. The casing section 11 is provided with a nipple 62 adapted for connection through a suitable pipe line with a source of vacuum, for example the intake manifold of the motor vehicle engine, and such pipe line is provided with a check valve 63.

The member 21 of the pressure-responsive unit 13 is provided with an axial sleeve 64 projecting toward the right as viewed in Figure 1 and surrounded by a thin sleeve 65, preferably formed of stainless steel, forming a smooth exterior surface operable in bearing and sealing elements 66 carried by the end member 57 and forming no part per se of the present invention. The end member 57 also carries an air cleaner indicated as a whole by the numeral 67 and to the casing of the air cleaner is connected an axially projecting sleeve 68. The outer end of the sleeve 68 is connected to the adjacent end of a boot 69 of the flexible bellows type, for a purpose which will become apparent.

Within the member 21 of the unit 13 is formed an elongated axial recess 70 in which is arranged a sleeve 71 fitting the recess 70 and provided at adjacent opposite ends with ports 72 and 73. These ports communicate with an elongated annular groove 74 around the sleeve 71.

The right hand end of the sleeve 71 and the adjacent portion of the sleeve 64 are provided with an annular groove 75 to receive an annular seal 76 which may be in the form of an O-ring. This ring is of such size that when free, as further described below, it projects slightly beyond an end face 76' formed on the sleeve 64 radially inwardly of the seal 76. The sleeve 71 is retained in position by a retaining plate 77 attached by screws 78 to the member 21. This member is provided in the left hand face thereof with a recess 79, the inner face 80 of which forms a seat for the attachment of the plate 77, and the face 80 is recessed to receive an annular seal 81 compressible by the plate 77 to prevent leakage of fluid around the outside of the valve sleeve 71.

A spool valve 85 is slidable in the sleeve 71. This valve is provided with a right hand end 86 (Figure 3) adapted for engagement with the seal 76 when the valve is in the "off" position shown in Figure 1. The interior of the sleeve 64 forms an air passage 87 and as will be apparent in Figure 3, movement of the valve 85 from its "off" position affords communication between the passage 87 and the ports 72, the right hand limits of which are very slightly to the left of the end surface of the sleeve 64.

The spool valve 85 is provided with an axial recess 88 in which is arranged a cushion 89 engageable by the head 90 of a stem 91. This stem projects from the apparatus as shown in Figure 1, through the boot 69, for direct connection with the brake pedal (not shown) of the motor vehicle so that movement of such pedal from its normal position moves the rod 91 toward the left as viewed in the drawings. The cushion 89 permits the rod 91 to rock slightly to accommodate itself to arcuate movement of the portion of the brake pedal to which it is connected.

The valve 85 is provided adjacent its left hand end with an annular groove 94 forming a shoulder 95 controlling communication between the ports 73 and the chamber 79. The left hand extremity of the valve 85 is provided with a head 96 engageable with the thickened central portion 97 of a pressure-responsive diaphragm 98. This diaphragm has its periphery 99 clamped between the members 20 and 21 of the pressure-responsive unit, these members being fixed to each other by suitable screws or the like (not shown). The diaphragm 98 separates the chamber 79 from a chamber 100 formed in the member 20, further described below.

The groove 74 of the valve sleeve 71 communicates through a passage 101 with the variable pressure chamber 61 of the motor. This chamber communicates through a passage 102, formed in the members 20 and 21, with the chamber 100 and accordingly it will be apparent that pressures in the chamber 61 will always be duplicated in the chamber 100 to affect the diaphragm 98. The upper end of the chamber 79 is provided with an enlargement 103 communicating with the motor chamber 60 through a port 104 and chamber 105 formed in the member 21, and through a port 106 formed in the member 20. Accordingly, the vacuum always present in the motor chamber 60 will be duplicated in the chamber 79.

The thickened central portion 97 of the diaphragm 98 contacts at its opposite or left hand side with the head 110 of a thimble 111 receiving an axially projecting stem 112 carried by a thimble 113 having an annular outstanding flange 114 seating against a shoulder 115 formed in the member 20. The thimble 113 receives an axial stem 116 formed on the adjacent end of the plunger 28.

A spring seat 118 is arranged in the member 20 and is provided with an annular flange 119 seating against a shoulder 120 formed in the member 20 and retained in position by a snap ring 121. At its right hand end, the spring seat 118 is provided with an internal annular flange 122 surrounding the thimble 111 is close proximity thereto. One end of a spring 123 seats at one end against the flange 119 and at its other end against the diaphragm 98. A similar spring 124 surrounds the thimble 111 and has opposite ends respectively engaging the flanges 114 and 122. The spring 124 normally holds the flange 114 against the shoulder 115 as shown in Figures 1 and 2, while the spring 123 normally moves the diaphragm 98 and valve spool 85 to the normal "off" position shown in Figure 1.

*Operation*

The parts normally occupy the positions shown in Figure 1. Under such conditions the spool valve 85 contacts the seal 76 and accordingly completely seals the ports 72 against leakage of air into the groove 74 or between the spool valve and the sleeve 71. In this connection it will be noted that air is always present in the interior of the sleeve 64, the air passage 87 being in communication with the atmosphere between sleeves 64 and 68 (Figure 1) through the air cleaner 67. At the same time, the valve groove 94 communicates with the ports 73 as shown in Figure 1, and accordingly the motor chamber 61 will be in communication with the motor chamber 60 through the various ports, passages, etc. 101, 74, 73, 79, 104, 105 and 106. Accordingly, the pressure-responsive unit 13 will be vacuum suspended. As previously stated, the motor chamber 60 is always in communication with the source of vacuum through the nipple 62 and the vacuum line leading thereto.

It will be noted that the spool valve is maintained in engagement with the seal 76 by the spring 123. It is well known that sleeve valves, while advantageous over poppet valves in connection with the controlling of fluid pressures, are disadvantageous for the reason that it is customarily impossible to prevent leakage around valves of this character. This slight leakage during operation of the brakes is unimportant, but it is highly important to prevent air from constantly leaking when the brake mechanism is not in operation, and especially when the vehicle motor stops. This leakage is positively prevented by the seal 76. Particular attention is invited to the fact that this sealing against leakage is particularly important if the engine "dies." If the control valve leaked air, the seepage of air in a very short time would "kill" the vacuum and render power operation of the brakes impossible. The automatic sealing against leakage when the parts are in the "off" position by engagement of the valve end 86 with the seal 76 positively prevents leakage of air into the motor and the brakes may be power operated fifteen or twenty minutes after the motor stops.

Assuming that the brakes are to be applied, the operator will depress the conventional brake pedal (not shown) to move the rod 91 toward the left. Slight initial movement of this rod disengages the valve end 86 from the seal 76 and "cracks" the ports 72 to the air passage 87. Simultaneously, the shoulder 95 of the valve spool will close communication between the ports 73 and the chamber 79. Under such conditions air will flow through ports 72 through groove 74 and passage 101 into the motor chamber 61 and the pressure in such motor chamber will start to rise. This rising pressure will be communicated through passage 102 to the diaphragm chamber 100 to start to build up a higher pressure against the left hand face of the diaphragm 98, this diaphragm having been also vacuum suspended in the "off" positions of the parts. Therefore, slight initial movement of the pedal operated rod 91 will start to energize the motor 10 and it will be noted in Figure 1 that the thimble head 110 is normally spaced from the center of the diaphragm 98 and accordingly initial movement of the rod 91 will not transmit movement to the plunger 28 and this plunger will remain stationary and not displace fluid from and raise the pressure in the high pressure chamber 29. However, there is no "soft" movement of the rod 91, which movement is objectionable in practice in many installations. Such initial movement of the brake rod will be resisted by differential pressures acting on the diaphragm 98 and these differential pressures will depend upon the degree of energization of the motor, thus giving the operator an important initial resistance to movement of the brake pedal which, while relatively light as is desired, is proportional to booster motor energization.

Shortly after initial energization, the center 97 of the diaphragm 98 will engage the thimble head 110 and the parts will assume the positions shown in Figure 2. During this portion of the operation it will be noted that the spring 123 will be somewhat compressed but there will be no compression of the spring 124. The spring 123, therefore, can be light enough merely to engage the spool valve with the seal 76 under normal inoperative conditions but not enough to disturb the resistance to movement of the pedal operated rod 91 substantially in proportion to booster motor energization.

Motor energization occurs very rapidly and for a portion of the travel of the brake pedal the parts tend to remain in the relative positions shown in Figure 2 with the flange 114 engaging the shoulder 115 and with the thimble head 110 in engagement with the center of the diaphragm 98, while at the same time the pressure-responsive unit 13 will move to the left in a follow-up action relative to the pedal-operated parts. Under such conditions, the plunger 28 and sleeves 23 and 24 will move as a unit to build up pressure in the chamber 29 and displace fluid through outlet 32 and lines 33 to the brake cylinders 34. Hydraulic resistance will be transmitted through the rod 28, diaphragm center 97 and spool valve 85 to the rod 91 to provide some, but not much, hydraulic "feel" in the brake pedal, this hydraulic resistance increasing materially after the brake shoes have been brought into engagement with the brake drums.

When hydraulic pressure has increased in the chamber 29 to a predetermined point which will differ in various installations, namely, from 50 to 80 pounds per square inch, this pressure will react against the end of the seal 26 and will be transmitted to the plunger 28 to tend to back up this plunger and associated elements from the relative positions of these elements shown in Figures 1 and 2. Under such circumstances, the flange 114 will leave the shoulder 115, for example as shown in Figure 3, and under such conditions the operator will be provided in the brake pedal with a "feel" which will be the sum of the resistances provided by hydraulic pressures in the chamber 29 and the elastic fluid pressures generated by the diaphragm 98, this diaphragm always having opposite sides subjected to differential pressures in the motor 10. Because of the increased resistance to pedal movement provided by the diaphragm 98, the plunger 28 may be made of smaller diameter so as not to provide too great a degree of resistance to movement of the brake pedal.

From the foregoing it will be apparent that the present construction does not give to the operator the feeling of the brake pedal "falling away" during initial brake pedal operation and provides something more than a mere spring resistance, the initial resistance being always proportional to the degree of motor energization and increasing as this energization increases even before substantial brake application takes place. The resistance becomes heavier as brake application increases and reaches a maximum at the point of maximum application of the brakes, which of course is desirable. In this connection it will be apparent that after engagement of the brake shoes with the drums takes place and hydraulic pressures are built up as stated above, for example from 50 to 80 pounds per square inch, the rod 28 and thimbles 111 and 113 become a floating unit in the pressure-responsive unit 13 and will be subject almost solely to foot pedal pressure and hydraulic pressure in the chamber 29, the only additional force being applied to this unit resulting from the tension of the spring 124 which normally seats the flange 114 against the shoulder 115. As maximum brake application is approached and maximum energization of the motor 10 has taken place, pressure in the chamber 29 tends to resist and slow down movement of the pressure-responsive unit, acting through sleeves 23 and 24. Thereafter, a further increase in foot pressure on the pedal will move the rod 28 toward the left to re-engage the flange 114 with the shoulder 115 and the parts thereupon assume the positions shown in Figure 2. If necessary, therefore, the operator can assist the motor 10 after there is a "run out" of power, to assist in the further generation of braking pressures in the chamber 29 and consequently in the brake lines and brake cylinders.

The present device therefore provides all of the desirable characteristics of booster brake operation by providing progressively increasing but not heavy resistances during initial movement of the brake pedal, followed by increasing resistances as the hydraulic pressure in the chamber 29 and differential pressures on the diaphragm 98 cooperate to resist movement of the rod 91. It also will be apparent that the present construction renders wholly feasible the use of a valve device of the spool and sleeve type regardless of unavoidable slight leakages which occur through the use of such valve mechanism. This is unimportant in the present case since these leakages make no difference during brake application, and are prevented in the "off" positions of the parts by the engagement of the valve end 86 with the seal 76. This seal and the check valve 63 serve effectively to maintain vacuum in both motor chambers 60 and 61 for a substantial length of time, even after the vehicle engine stops running.

We claim:

1. A fluid pressure mechanism comprising a hydraulic fluid chamber for communicating pressurized fluid to a fluid pressure operated mechanism, a motor having a differential pressure-responsive unit including a fluid displacing member extendible into said chamber, said unit defining opposed chambers in said motor, a source of power for energizing said motor, and operating-and-reaction transmitting means in said motor for operating said motor and transmitting feel characteristics to an operator in relation to energization thereof and fluid pressure developed in said chamber, said means comprising control valve means operatively connected to said source of power for energizing said motor and normally biased to an off position and supported for movement relative to said pressure-responsive unit, manually-operable means operatively connected to said valve means for operating said valve means and transmitting reaction characteristics to an operator of the motor, a hydraulic reaction member supported for movement relative to said fluid displacing member and including portions subject to pressure generated in said hydraulic fluid chamber, a differential pressure-responsive reaction member movable relative to said power unit and said fluid displacing member and operable to oppose movement of said manually operable means during a predetermined increment of initial motor energization for providing immediate first stage reaction characteristics, said hydraulic and differential pressure-responsive reaction members combining to transmit a second stage reaction force to said manually operable means during subsequent motor energization and development of hydraulic fluid pressure in said chamber.

2. A fluid pressure mechanism as set forth in claim 1 in which said hydraulic reaction member and manually operable means comprise axially displaceable alined rod elements including adjacent end portions effective with portions of said differential pressure-responsive member and valve means for transmitting hydraulic reaction to an operator of the motor, said differential pressure-responsive reaction member including portions effective to transmit reaction force prior to and during transmittal of hydraulic reaction.

3. A fluid pressure mechanism as set forth in claim 2 in which said differential pressure-responsive reaction member comprises a diaphragm biased toward said manually operable means whereby the initial increment of movement of said manually operable means is immediately resisted by a biasing force resulting from differential pressure in proportion to motor energization in the absence of generation of hydraulic fluid pressure.

4. A fluid pressure mechanism as set forth in claim 3 including biasing means between said power unit and said hydraulic reaction member urging said member away from said manually operable means during the predetermined increment of initial movement of said manually operable member until a predetermined hydraulic fluid pressure is generated.

5. A fluid pressure mechanism as set forth in claim 1 in which said differential pressure-responsive member comprises a diaphragm in said motor unit operatively connected between said hydraulic reaction member and manually operable means, said diaphragm defining opposed chambers in said motor unit operatively connected to said opposed chambers of said motor unit whereby a differential pressure is imposed on said diaphragm in immediate opposition to the direction in which said power unit moves when energized prior to transmittal of hydraulic pressure reaction force.

6. A fluid pressure mechanism as set forth in claim 5 in which said control valve means is interposed between said diaphragm and said manually operated means, biasing means between said motor unit and said diaphragm urging the diaphragm into engagement with said valve means in spaced relation from said hydraulic reaction member whereby the predetermined increment of initial movement of said manually operable means and movement of the control valve means from its off position immediately result in a differential pressure force opposing movement of said manually operable means toward a motor energizing position.

7. A fluid pressure mechanism as set forth in claim 6 including means biasing said hydraulic reaction member away from said differential pressure-responsive member until a predetermined hydraulic pressure is developed whereby the reaction force at said manually operable means initially comprises differential pressure reaction forces in proportion to motor energization and subsequently comprises both differential and hydraulic pressure forces in relation to motor energization and generation of hydraulic pressure.

8. A booster brake mechanism comprising a hydraulic chamber having an outlet for connection with the vehicle wheel cylinders, a fluid motor having a pressure movable unit including a sleeve movable into said hydraulic chamber to displace fluid therefrom, a plunger slidable in said sleeve to displace fluid from said chamber, a valve mechanism connected to said motor and to sources of relatively high and low pressures for controlling energization of said motor, said valve mechanism comprising a sleeve carried by said pressure movable unit and a manually operable valve slidable in said sleeve and normally occupying a position balancing pressures in said motor and being movable in the direction of said chamber to unbalance pressures in said motor, a diaphragm in said pressure movable unit dividing the interior of the latter to form chambers connected to opposite ends of said motor and having a portion engageable with said manually operable valve to oppose movement of the latter from its normal position, a spring interposed between said pressure movable unit and said diaphragm to urge the latter toward said manually operable valve, a spring interposed between said pressure movable unit and a portion of said plunger to urge the latter to a normal position relative to said sleeve from which position it is movable relatively toward said manually operable valve by hydraulic pressures in said chamber, and a thimble carried by said plunger and normally spaced from said diaphragm, said thimble being engageable with said diaphragm when said plunger is moved from its normal position by pressures in said chamber to assist said diaphragm in opposing movement of said manually operable valve away from its normal position.

References Cited in the file of this patent

UNITED STATES PATENTS

| | | | |
|---|---|---|---|
| 2,006,487 | Sorensen | July 2, | 1935 |
| 2,260,491 | Stelzer | Oct. 28, | 1941 |
| 2,458,803 | Stelzer | Jan. 11, | 1949 |
| 2,532,960 | Stelzer | Dec. 5, | 1950 |
| 2,685,170 | Price | Aug. 3, | 1954 |
| 2,685,171 | Price | Aug. 3, | 1954 |
| 2,685,172 | Price | Aug. 3, | 1954 |
| 2,690,740 | Hupp | Oct. 5, | 1954 |